(12) United States Patent
Latvakoski

(10) Patent No.: US 7,408,899 B1
(45) Date of Patent: Aug. 5, 2008

(54) METHOD FOR ALLOCATING COMMUNICATION RESOURCES

(75) Inventor: Juhani Latvakoski, Haukipudas (FI)

(73) Assignee: Nokia Corporation, Espoo (FI)

( * ) Notice: Subject to any disclaimer, the term of this patent is extended or adjusted under 35 U.S.C. 154(b) by 1165 days.

(21) Appl. No.: 09/980,897

(22) PCT Filed: Jun. 2, 2000

(86) PCT No.: PCT/EP00/05055

§ 371 (c)(1), (2), (4) Date: Mar. 25, 2002

(87) PCT Pub. No.: WO00/76244

PCT Pub. Date: Dec. 14, 2000

(30) Foreign Application Priority Data

Jun. 4, 1999 (GB) ................................. 9913099.9

(51) Int. Cl.
*H04Q 7/20* (2006.01)
*H04J 3/24* (2006.01)
(52) U.S. Cl. ..................... 370/329; 370/441; 370/468
(58) Field of Classification Search .............. 370/328, 370/329, 441, 465, 232, 477, 468
See application file for complete search history.

(56) References Cited

U.S. PATENT DOCUMENTS

| 4,962,498 A | * | 10/1990 | May, Jr. ..................... 370/474 |
| 5,448,759 A | | 9/1995 | Krebs et al. ................. 455/54.1 |
| 5,457,680 A | * | 10/1995 | Kamm et al. ................ 370/332 |
| 5,673,259 A | | 9/1997 | Quick, Jr. .................... 370/342 |
| 5,818,871 A | | 10/1998 | Blakeney, II et al. ......... 375/220 |
| 6,078,568 A | * | 6/2000 | Wright et al. ................ 370/312 |
| 6,347,091 B1 | * | 2/2002 | Wallentin et al. ........... 370/437 |

FOREIGN PATENT DOCUMENTS

| WO | WO 96/10875 | 4/1996 |
| WO | WO 97/50263 | 12/1997 |

OTHER PUBLICATIONS

Harry Newton, "Newton's Telecom Dictionary", 1994, Flatiron Publishing, Inc., 8th updated edition, p. 817.*

* cited by examiner

*Primary Examiner*—Min Jung
(74) *Attorney, Agent, or Firm*—MacDonald Illig Jones Britton LLP

(57) ABSTRACT

A method and apparatus for allocating one of a plurality of communication resources of communication networks in which information is transferred between a first station and one or more second stations, said method comprising the step of allocating one of said communication resources based on the quantity of information to be transferred.

20 Claims, 2 Drawing Sheets

METHOD FOR ALLOCATING COMMUNICATION RESOURCES

FIELD OF THE INVENTION

This invention relates to a method for allocating communication resources and in particular, but not exclusively, to a method for allocating radio channels in cellular communication networks.

BACKGROUND TO THE INVENTION

The area covered by a cellular network is divided into a plurality of cells or cell sectors. Each cell or cell sector is served by a base station which transmits signals to and receives signals from mobile stations located in the cell or cell sector associated with the respective base station. Signals transmitted from a base transceiver station to a mobile station are referred to herein as "downlink signals" and signals transmitted from a mobile station to a base station are referred to herein as "uplink signals". The downlink communication stream received by a mobile station from its base station can comprise packets which may be transferred in the form of a plurality of smaller component parts, referred to herein as payload units. The payload units together make up the original packet. These packets can include control information and/or data. The uplink communication stream received by the base station from each mobile station may comprise similar packets.

The term "packet" used herein refers generally to the packet of data which is to be transferred using the allocated communication resources. Typically, the packets comprise data generated by users and/or applications. Thus, examples of packets include user data documents, such as zip files and emails, digitised speech, video and other similar types of data files.

Network control elements manage the allocation of communication resources to allocate the downlink and uplink radio channels which are used for the transmission of the packets. One type of communication channel is known as a common communication channel. On this type of channel, the base station transmits information which may be intended for a number of the mobile stations within its cell or cell sector. A given packet may be intended for all the mobile stations or only for one of the mobile stations. Thus, a mobile station within the cell or cell sector monitors the or each common channel for packets intended for that mobile station. At least one common communication channel is generally continually in existence between a base station and at least some of the mobile stations within its cell or cell sector. Common channels can also be provided in the uplink direction.

Another type of communication channel is known as a dedicated communication channel. Dedicated channels are channels which are established only between the base station (or the base station subsystem) and the mobile station involved in a given communication. Packets to only a single mobile station can be contained in a dedicated channel. The information in the form of packets is then transmitted to the destination mobile station using the dedicated channel. Dedicated channels can be provided in the uplink direction. Alternatively, the direction of data transfer in a dedicated channel can be in both the uplink and downlink directions.

Known methods for allocating communication resources in cellular radio networks in which packets are transferred are inefficient in that they do not optimise the use of the air interface in either the uplink or downlink direction. For example, existing methods for allocating radio resources tend to be based on a buffer allocation status and/or data transfer rate considerations.

If radio resource allocation is based on the buffer allocation status, the result can be that radio resources are negotiated several times for each packet. For example, a large zip file of 1 mbyte in size would typically be divided into a plurality of smaller payload units, each payload unit having a size of say 10 bytes to 1K. All of the payload units may not have been received in the buffers when the radio resource allocation process is initiated, and thus a further allocation process is required once the remainder of the payload units have been received in the buffers.

Where allocation of radio resources is performed based on data transfer rate considerations, the system can suffer from unnecessary reservation of radio resources and/or many resource allocation changes, each of which requires a repeat of the negotiation process.

Thus, known methods result in unnecessarily complicated resource negotiation processes and may result in a dedicated channel being unnecessarily provided. This will inevitably reduce available radio resources.

Embodiments of the present invention seek to provide an improved method for the allocation of communication resources.

SUMMARY OF THE INVENTION

According to an aspect of the present invention there is provided a method for allocating one of a plurality of communication resources of communication networks in which information is transferred between a first station and one or more second stations in the form of at least one packet, said method comprising the step of allocating one of said communication resources based on the quantity of information to be transferred.

Preferably, the communication resources allocated are radio communication channels.

Preferably, the channels comprise a common communication channel between the first station and a plurality of second stations, and a dedicated communication channel between the first and a selected one of the second stations only.

Preferably, if the at least one packet to be transferred is less than a predetermined size, then a common communication channel is allocated for transfer of the at least one data packet between the first and a selected one of the second stations.

Preferably, if the at least one packet to be transferred is greater than a predetermined size, then a dedicated communication channel is allocated for the transfer of the at least one data packet between the first and second stations.

Where the size of the packet to be transferred is substantially equal to the predetermined size, a common or dedicated communication channel may be allocated.

Preferably, the at least one packet to be transferred comprises a computer generated data file; a zip file; an email file; and/or speech.

Preferably, the at least one packet to be transferred comprises information on the destination of the packet.

The at least one packet to be transferred may comprise two or more associated packets. In that case, the combined size of the two or more associated packets is taken into account in said allocating step. These principles may be applied irrespective of the number of payload units making up the or each packet.

According to a second aspect of the present invention there is provided a network element for allocating one of a plurality of communication resources of communication networks in which information is transferred between a first station and one or more second stations in the form of at least one packet, said element comprising means for allocating one of said communication resources based on the quantity of information to be transferred.

Preferred embodiments achieve a more efficient use of available communication channels and thus permit communications of various origins to be more effectively interleaved on the communication network. Preferred methods achieve reduced signalling overheads and require less hardware time, particularly when compared with methods which allocate radio resources separately for parts of communications. Thus, preferred methods lead to faster message delivery while at the same time generating less interference, because additional channels are only established when they are required to transfer sizable packets and so do not occupy available bandwidth otherwise.

In one envisaged embodiment the information to be transferred is a user data document. If the size of the user data document to be transferred is lower than a predetermined size, and the subsequent user/data actions cannot be predicted, then the user data document can be sent through common communication channels, if a dedicated communication channel has not already been established. Examples of common communication channels include the RACH (Random Access Channel and the FACH (Forward Access Channel), both of which may be unidirectional. However, other types of common channel may also be employed instead of the RACH and FACH channels or at the same time. If the size of the user data document is greater than a predetermined size, and the subsequent user/data actions cannot be predicted, the user data document is sent through a dedicated communication channel and the radio resource allocation is performed for each user data document separately. Where many user/data actions can be predicted to the extent that the resulting user data documents can be associated with one another, then the resource allocation is based on a summation of the sizes of the associated user data documents. In this envisaged embodiment if the size of the user data document is equal to the predetermine size, then a dedicated channel may be allocated.

Preferred methods are typically, but not exclusively, performed in a cellular communications network.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
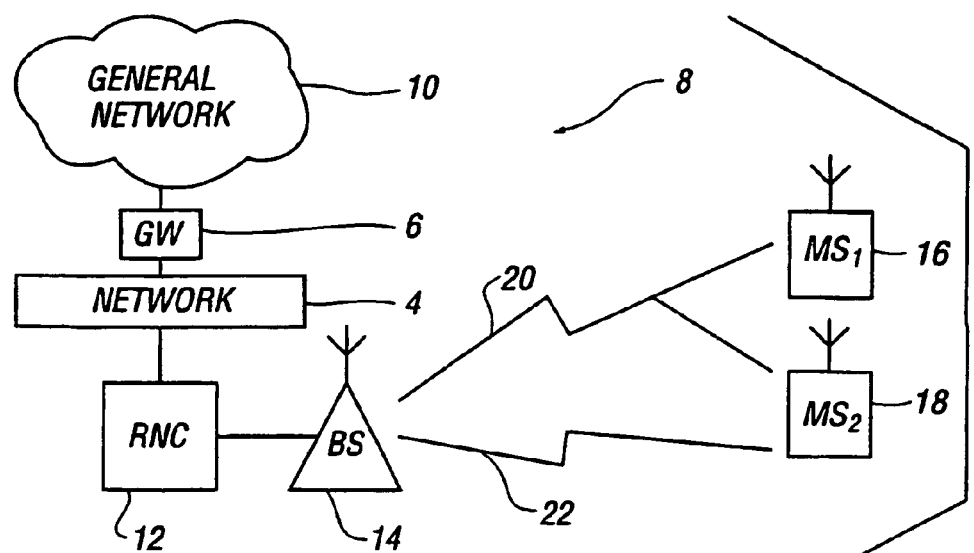
FIG. 1 illustrates part of a cellular communication network in which information is transferred as packets.

Referring to FIG. 1, the invention is described in the context of the allocation of radio resources in a wide band code division multiple access (WCDMA) system. As depicted in FIG. 1, the cellular communication network 8 comprises a radio network controller (RNC) 12, a base station (BS) 14 and a plurality of mobile stations 16,18. The other network elements upstream of the radio network controller are not separately shown and are referenced by numeral 4. Reference numeral 4 also refers to other radio network controllers, base stations and mobile stations which form part of the network and which are not shown in FIG. 1. The cellular communication network 8 may be on any scale required to meet the demands of the application. That is, any number of radio network controllers 12 and base transceiver stations 14 may be connected to provide a cell structure of appropriate geography. Typically a number of base stations will be connected to each of a number of radio network controllers. For clarity, only a single base station is shown as being connected to the radio network controller. In this example, the cellular network 8 is connected to another communication network 10 via a gateway 6. The other communication network 10 can be wired and/or wireless.

The radio network controller 12 manages the allocation of communication resources including the air interface between the base transceiver station 14 and the or each mobile station 16,18 in the associated cell or cell sector. The radio network controller 12 may provide switching functions, message processing functions and channel configuration functions. The radio network controller 12 manages the transfer of control information and data over the communication channels which are established between the base transceiver station 14 and the respective mobile stations 16 and 18. The base transceiver station 14 comprises antenna equipment and associated circuitry for transmitting and receiving packets to and from mobile stations 16,18 within its associated cell or cell sector.

When a packet is to be sent to a given mobile station 18, a communication is initiated indicating the identity assigned to the destination mobile station. The packet may originate in the same network, i.e. network 8, in which the destination network 10. The elements of the network 8, upstream of the radio network controller 12 associated with the destination mobile station, route the packet to the radio network controller 12 associated with the destination mobile station. This may be via a separate switching element (e.g. a mobile services switching centre) upstream of the radio network controller and which performs checks on location registers.

The radio network controller 12 controls the base station 14 to transmit a control signal on a common channel 20. This channel may be, but is not necessarily, used only for control signals. There may be a common control signal channel for each of the uplink and downlink communications. Alternatively the control channel can be shared in the up and downlink directions. The destination mobile station 18 receives the control signal while monitoring the common channel 20 and transmits a response. The base station 14 forwards the response to the radio network controller 12 which can allocate a channel to be used for the transfer of the packet between the base station 14 and the mobile station 18.

The radio network controller 12 then sends to the base station a channel assignment signal comprising information on the channel to be used. This channel will either be a dedicated channel or a common channel. The rules for determining whether a dedicated or common channel is used will be described in more detail hereinafter. If a dedicated channel is used, that channel may need to be set up if it is not already in existence. Details of the channel to be used in the transfer of the packet are forwarded from the base station 14 to the mobile station 18. If necessary, the mobile station 18 can take the necessary steps for the set up of a dedicated channel or the common channel. When both the base station 4 and the mobile station 18 have information on the channel to be used, the packet can be transferred. If the channel is already set up, the packet can simply be transferred.

When a packet is to be sent from a mobile station 18 to a destination node or end terminal, which may be in the same network 8 as the mobile station or in another network 10, the originating mobile station 18 sends a request to the base transceiver station 14 which is forwarded to the radio network controller 12. This request will be forwarded to the upstream elements of the network such as a mobile services switching centre, so that the location of the destination can be determined. The radio network controller 12 receives the request from the source mobile station 18 and allocates a channel to be used for the transfer of the packet between the mobile station 18 and the base station 14. This information is sent to the base station 14 which in turn forwards the information to the mobile station. When both the base station 14 and the mobile station 18 have information on the channel to be used, the packet can be transferred therebetween. If the channel is already set up, the packet can simply be transferred.

In this example, the control/request signals from the base station 14 to the mobile station 18 and from the mobile station 18 to the base station 14 and packets themselves are transmitted on common control channels. This information can be transmitted on common data channels, such as random access channels and fast access channels, or on dedicated channels.

A preferred communication resource allocation process in which radio resources are allocated once for each packet to be transferred is described below with reference to FIGS. 2, 3 and 4. In particular, the channel to be used for the transfer of a given packet is allocated once for each packet based on the size of the packet. Typically, the size of the packet used in the allocation is the size of the data file generated at the application level, for example that of the original application generated data document. Therefore, the packet size is the size of the packet received by the protocol stack PS from the highest application level. Typically, but not necessarily, the packet to be transferred is a user data document such as an email, facsimile or zip file. Alternatively, the packet may comprise packetised speech or video data such as that transferred in packet switched Internet environments.

Figure 2:
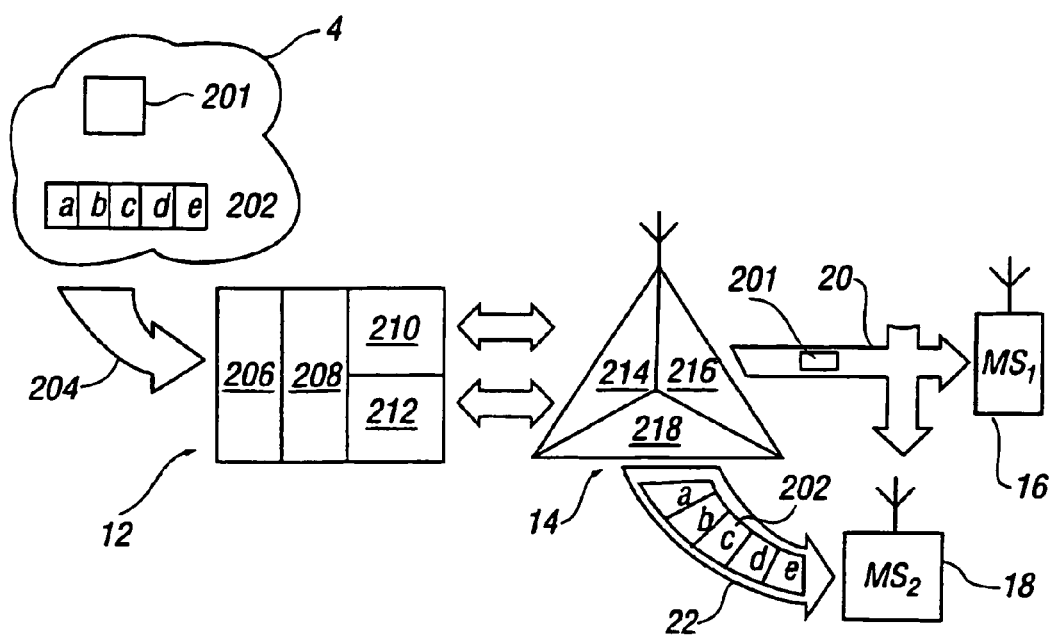
FIG. 2 shows the preferred method for allocating radio resources where the subsequent packet generation behaviour is not known.

Reference is first made to FIG. 2. This shows the scenario where subsequent packet generation behaviour is not known. In other words, it is not known if there will be any subsequent packets which could be associated with the first packet. A first packet 201 from upstream components of the network 8 is destined for the second mobile station 18. The packet 201 is routed to the radio network controller 12 as indicated by the arrow 204. The illustrated radio network controller 12 comprises a receive interface 206, decision circuitry 208, control signal circuitry 210 and routing circuitry 212. The packet 201 is received at the receive interface 206 and forwarded to the decision circuitry 208. The decision circuitry knows the size of the packet 201 and uses this to allocate a channel to be used over the air interface. Possible, methods used by the decision circuitry 208 to ascertain the size of the packet are described hereinafter.

The size of the packet to be transferred is compared with a predetermined size threshold in order to make the channel allocation decision. If the size of the packet 201 is smaller than a predetermined size, no subsequent message packets are associated with the packet 201 and an available dedicated channel is not already in existence, then the decision circuitry 208 allocates a common channel 20 for transferring the packet 201 between the base station 14 and the destination mobile station 18. However, if the size of the packet 201 is greater than the predetermined size, then the decision circuitry allocates a dedicated channel 22 for transferring the packet 201 between the base station 14 and the destination mobile station 18. The radio resource allocation is performed separately and only once for each packet.

In the case of packet 201, the packet is smaller than the predetermined size and the decision circuitry of the radio network controller allocates the common channel 20. The radio network controller controls the exchange of control/request signals between the base station 14 and the destination mobile station 18, as described generally in relation to FIG. 1.

The control/request signalling process between the base station 14 and the mobile station 18 is initiated by the radio network controller before, at the same time or after the decision circuitry allocates the channel. Once both communicating stations have information on the channel that is to be used, the packet 201 can be transferred. In some embodiments, if the channel to be used has already been set up, then the packet can simply be transferred. If a common channel is allocated it will generally already be in existence and a portion of the data packet (for example the packet header) identifies the destination mobile station 18. This means that the destination mobile station 18 can identify packets intended for it.

Thus, if the packet 201 comprises an email message which may be transferred as a packet of 4 kbytes in size, wideband code division multiple access radio resources are only reserved once for those 4 kbytes of data. If 4 kbytes is less than the predetermined packet size then the packet comprising the email content is sent on the common channel.

Now consider a second packet 202 destined for the second mobile station 18. The second packet 202 is larger than the first packet 201 and is transferred in the form of a plurality of payload units (a)-(e). The packet 202 is routed to the radio network controller 12 in the usual manner where it is received by the interface circuitry 206 and passed to the decision circuitry 208 in order for the channel to be allocated. In the case of the second packet 202, the size of the packet is greater than the predetermined packet size and the decision circuitry allocates a dedicated communication channel 22 for transferring the packet 202 between the base station 14 and the destination mobile station 18. The control signal circuitry 210 of the radio network controller 12 produces a control signal comprising information on the allocated channel which is sent to the base station 14, and if the allocated dedicated channel is not already in existence it is then established. Again, the exchange of control signals between the base station 14 and the destination mobile station is initiated by the radio network controller 12 before, during or after the allocation process. When both the mobile station and the base station have information on the channel which has been allocated and the channel has been established, all of the payload units of the packet 202 can be transferred. Note that the communication resources are allocated only once for the packet 202 just as in the case of the smaller packet 201.

Thus, if the packet 202 comprises a zip file which may be transferred as a data packet of 900 kbytes in the form of a plurality of 10 byte payload units, the wideband code division multiple access radio resources are allocated once for that zip file. Assuming that the packet of 900 kbytes is greater than the predetermined packet size, then the packet comprising the zip file will be allocated to a dedicated communication channel. It should be appreciated that the packet 202 would have been allocated a common channel had it been smaller than the predetermined size.

Figure 3:
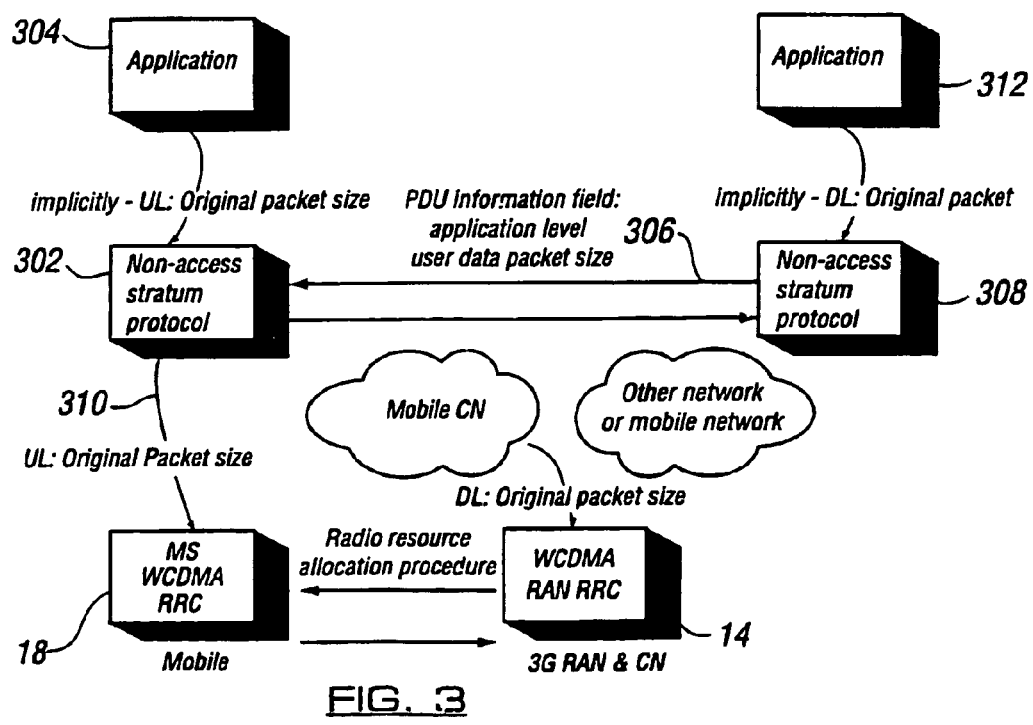
FIG. 3 shows schematically how information relating to the size of the packet to be transferred can be forwarded by the network.

FIG. 3 illustrates how information on the size of the original application level user/data document can be transferred between the communicating stations and the relevant network elements. For example, information on the size of the user/data document can be transferred to the radio resource control protocol as a service primitive parameter and/or transmitted as an information element of a non-access stratum protocol (e.g. a protocol data unit (PDU) field).

Referring to FIG. 3, first consider transfer of the packet in the uplink direction. The size of the packet to be transferred is implicitly known by the non-access stratum protocol 302 of the mobile station 18 which receives it from the application 304. The information on size is transferred from the non-access stratum protocol 302 of the mobile station 18 to the radio resource control protocol for use in the radio resource allocation procedure. This size information can be delivered to the same layer as the relevant network element in the form of a service primitive parameter. Optionally the size information may be included as an information element of a non-access stratum protocol, for example in a PDU field. However, including the information as part of a non-access stratum protocol is only possible if the receiving end of the communication, namely non access stratum protocol 308 permits this. In certain embodiments, the size information is transferred both as a service primitive parameter and as an information element of the non-access stratum protocol.

Still referring to FIG. 3, now consider transfer of the packet in the downlink direction. Information on the size of the packet to be transferred is implicitly known by the non-access stratum protocol of the network 308. This information is provided when the packet is received from the application 312. Non-access stratum protocol 308 may comprise, for example, a server computer and related software in a wired environment connected to the Internet. Typically, the non-access stratum protocol may comprise several layers such as TCP and/or UDP, IP etc. In the case of a wired server computer the non-access stratum protocol would also contain the physical layers of the wired system. If the destination mobile station 18 is part of a 3rd generation mobile system, the information on size can be transferred as described above in relation to the uplink direction. That is, it is transferred to the radio resource control protocol as a service primitive parameter and, optionally, also included as an information element in a PDU of a non-access stratum protocol. Thus, use of the information element is optional but the use of a service primitive parameter may be required. Consider a communication from the application 312 to the application 304. Assume that the application 304 is within a 3rd generation mobile network and that the application 312 is run on a web server with associated protocols. The size information can, in this example, be sent as an information element of a protocol data unit of a non-access stratum protocol and passed as a service primitive parameter to the underlying radio resource control protocol. The information content of such an information element can be the application level user/data document size.

It should be appreciated the packets to be transferred can comprise any subject matter the user wants to transfer and are frequently of the order of a Megabyte or so in size. The size information on the original user data document size can be, a part of an IP packet header. However, it may alternatively be included in PDU of some other non-access stratum protocol, such as TCP, UDP, GTP etc. The network itself may be heterogenous and therefore a new information element may be required. Such information elements are transferred through heterogenous networks in the header of the packet because the communication is packet switched.

Figure 4:
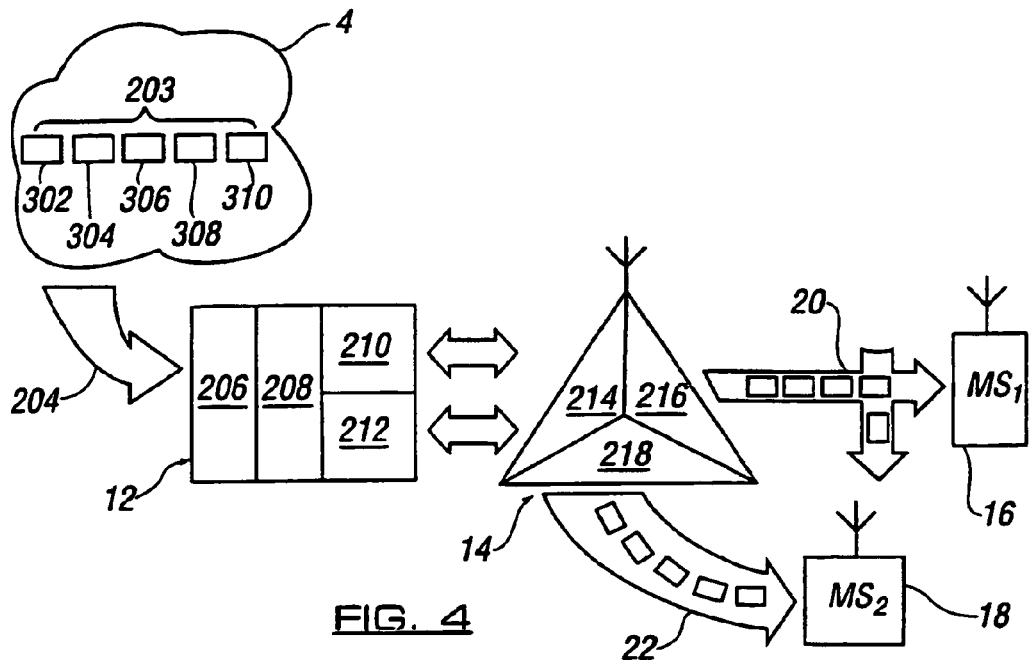
FIG. 4 shows a second embodiment of the preferred method for allocating radio resources where the subsequent packet generation behaviour is known.

FIG. 4 shows the scenario where a number of packets 302-310 may be associated in a group 203. These types of "associated" packets are typically transferred as a succession of two or more packets intended for the same receiver station and may be associated whenever it is known that the first packet is succeeded by one or more subsequent packets. Thus, the packet generation behaviour is to some extent predictable. For the purposes of resource allocation, such a group of associated packets is deemed to include all of the individual packets 302-310 and the quantity of information to be transferred (ie the size of the communication) is regarded as the sum of the individual packet sizes 302-310. Thus, the total byte size of the group of associated packets 203 is generated from the sum of the individual packet sizes 302-310. If the size of the combined group of packets 203 is smaller than a predetermined size, then a common channel can be allocated. However, if the size of the group of packets 203 is greater than a predetermined size, then a dedicated channel can be allocated. The plurality of data packets making up the group of packets 203 are preferably transmitted successively on the allocated channel. Other features of FIG. 4 correspond to features of FIG. 2 and the other aspects of the process would operate similarly.

The principal described in relation to FIG. 4 can be applied whether or not each member of the group of associated packets 203 originates from the same message/communication or originates from different messages/communications. Similarly, these rules can be applied to groups of associated packets whether or not individual packets of the group include smaller payload units.

Preferred embodiments achieve a more efficient use of available communication channels and thus permit communications of various origins to be more effectively interleaved on the communication network. Preferred methods achieve reduced signalling overheads and require less hardware time, particularly when compared with methods which allocate radio resources separately for parts of packets or parts of groups of associated packets. Thus, preferred methods lead to faster message delivery while at the same time generating less interference, because additional channels are only established when they are required to transfer sizable packets and so do not occupy available bandwidth otherwise.

In modified versions of the method, a different size threshold may be used in the channel allocation decision for different-packet transfer scenarios. For example, a first size threshold may be applied when a discrete packet is to be transferred and a second, different, size threshold may be applied when a group consisting of two or more associated packets is to be transferred.

In other modified versions of the method, the arrival time or intended destination of a packet or of successive packets may be taken into account in the channel allocation process. For a group of packets, the time over which the packets are to be transmitted can be taken into account in the allocation process.

In another modified version of the method, one or more of the communication channels may terminate at the radio network controller as opposed to at the base station.

In another modified version of the method, the channel allocation process may take into account what channels are already established, if any, between the communicating stations and the extent to which any existing channels are already being used.

In another modified version of the method, the channel allocation process takes into account which channels are likely to be needed for the communication of subsequent packets which are associated with a given packet. Typically, a prediction of the size of one or more packets to be sent subsequently is taken into account in the allocation procedure.

In the case of uplink channel allocation, the originating mobile station 18 can send information indicative of the packet size or size of the group of packets to the radio network controller 12 via the base station 14.

The invention should not be limited to the configurations of described embodiments. Specifically, the described embodiments show examples of configurations which may be used to implement the invention and are not intended to define the only type, configuration or interconnection of the network elements which should be used.

In the preferred embodiment the radio network controller 12 receives a parameter indicating the size of a given packet before it begins to receive the packet itself. In another embodiment, the network controller 12 receives a size parameter at the same time as the packet. In certain embodiments, packet size information is transferred to a radio resource control protocol as a service primitive parameter. Packet size information can also be transmitted as an information element of a non-access stratum protocol (e.g. PDU). In some embodiments, packet size information is transformed both as a service primitive parameter and as an information field of a non-access stratum protocol. In another embodiment the radio network controller receives the size parameter as part of the header information of the packet to be transferred. In another embodiment a network element other than the radio network controller 12 may receive the packet size parameter and perform the allocation function.

In another embodiment, the radio network controller 12, or another element responsible for channel allocation, determines the size of the communication for which a channel is to be allocated, rather than being provided with information on the size.

Control and message protocols will inevitably depend on the system in which the method is implemented. For example, some or all of the control signals described in relation to FIG. 1 may not be required or may be replaced by information in the header of message packets. In another embodiment the transfer of the or each packet or payload unit is managed to achieve efficient interleaving with other packets on the allocated communication channel. In certain embodiments, the inclusion of network information into the packets results in their size deviating from the size of the original data file.

As has been explained hereinbefore, it is possible for a given packet to comprise more than one payload unit. Similarly, it is possible for packets having predictable data generation behaviour to be associated in a group and allocated some or all of the same radio resources, whether or not such packets have a common origin or different origins.

Although preferred methods have been described in the context of code division multiple access systems, methods according to the present invention can be implemented in any suitable analogue or digital radio communication system. For example, preferred methods may be implemented using GSM, DCS 1800, TACT, AMPS, NMT, and RD-LAP systems. Preferred methods can be employed with any multiple access system, for example, on time division multiple access (TDMA) systems frequency division multiple access (FDMA) systems, other spread spectrum systems and hybrid systems thereof.

For clarity, the preferred method has been explained in the context of allocating communication resources including a common and a dedicated channel. In practice however the system is likely to include a plurality of common/dedicated channels.

The invention claimed is:

1. A method comprising the step of:
allocating one of a plurality of communication resources of communication networks in which information is transferred between a first station and one or more second stations in the form of at least one packet, one of the communication resources being allocated based on the size of the at least one packet to be transferred,
wherein information relating to the size of the at least one packet to be transferred is provided to a network element performing the allocating step, and information relating to the size of the at least one packet is transferred both as a service primitive parameter and as an information element of a protocol data unit.

2. A method according to claim 1, wherein the communication resources allocated are radio communication channels.

3. A method according to claim 2, wherein the channels comprise a common communication channel between the first station and a plurality of second stations, and a dedicated communication channel between the first and one of said second stations.

4. A method according to claim 3, wherein if the at least one packet to be transferred is less than a predetermined size, then the common communication channel is allocated for transfer of the at least one data packet between the first and second stations.

5. A method according to claim 3, wherein if the at least one packet to be transferred is less than a predetermined size, and subsequent packet generation actions cannot be predicted, then the common communication channel is allocated for transfer of the at least one data packet between the first and second stations.

6. A method according to claim 3, wherein if the at least one packet to be transferred is greater than a predetermined size, then the dedicated communication channel is allocated for the transfer of the at least one data packet between the first and second stations.

7. A method according to claim 3, wherein the at least one packet to be transferred is allocated the dedicated channel if said dedicated channel is already established.

8. A method according to claim 1, wherein the at least one packet to be transferred comprises two or more associated packets.

9. A method according to claim 8, wherein the combined size of the two or more associated packets is taken into account in said allocating.

10. A method according to claim 9, wherein the at least one packet to be transferred comprises information relating to its size or combined size.

11. A method according to claim 10, wherein a network element performing the allocating determines the size of the at least one packet to be transferred.

12. A method according to claim 1, wherein communications between said first and second stations use a code division multiple access system.

13. A method according to claim 1, wherein said allocating is carried out by a radio network controller.

14. A method according to claim 1, wherein one of said first and second stations is a base station.

15. A method according to claim 1, wherein one of said first and second stations is a mobile station.

16. A method according to claim 1 performed in a radio communications network.

17. A method according to claim 1, wherein the packet to be transferred comprises a plurality of component parts.

18. A method according to claim 1, wherein the at least one packet to be transferred comprises a computer generated data file; a zip file; an email file; video data and/or speech data.

19. A network element comprising:

Circuitry configured to allocate one of a plurality of communication resources of communication networks in which information is transferred between a first station and one or more second stations in the form of at least one packet, one of said communication resources being allocated based on the size of the at least one packet to be transferred, wherein information relating to the size of the at least one packet to be transferred is provided to the circuitry, and information relating to the size of the at least one packet is transferred both as a service primitive parameter and as an information element of a protocol data unit.

20. A network element comprising means for allocating one of a plurality of communication resources of communication networks in which information is transferred between a first station and one or more second stations in the form of at least one packet, said element comprising means for allocating one of said communication resources based on the size of the at least one packet to be transferred, wherein information relating to the size of the at least one packet to be transferred is provided to the means for allocating, and information relating to the size of the at least one packet is transferred as both a service primitive parameter and as an information element of a protocol date unit.

\* \* \* \* \*